(12) United States Patent
Köpke (10) Patent No.: US 11,274,940 B2
(45) Date of Patent: Mar. 15, 2022

(54) SUSPENSION POSITION MONITORING SYSTEM

(71) Applicant: Koepke InnoTek Ltd. T/A Motoklik, Graiguenamanagh (IE)

(72) Inventor: Jens Köpke, Graiguenamanagh (IE)

(73) Assignee: Koepke InnoTek Ltd. T/A Motoklik, Graiguenamanagh (IE)

( * ) Notice: Subject to any disclaimer, the term of this patent is extended or adjusted under 35 U.S.C. 154(b) by 184 days.

(21) Appl. No.: 16/432,894

(22) Filed: Jun. 5, 2019

(65) Prior Publication Data

US 2019/0376814 A1  Dec. 12, 2019

(30) Foreign Application Priority Data

Jun. 8, 2018 (IE) ..................................... 2018/0165

(51) Int. Cl.
   *G01D 5/14* (2006.01)
   *B62J 99/00* (2020.01)
   (Continued)

(52) U.S. Cl.
   CPC .............. *G01D 5/145* (2013.01); *B62J 99/00* (2013.01); *B62J 45/40* (2020.02); *B62K 25/06* (2013.01); *B62K 25/28* (2013.01); *B62L 1/005* (2013.01)

(58) Field of Classification Search
   CPC ........ G01D 5/142; G01D 5/145; G01D 5/147; G01D 5/16; G01D 5/165; G01D 11/245;
   (Continued)

(56) References Cited

U.S. PATENT DOCUMENTS

| 4,107,604 | A |   | 8/1978 | Bernier |           |
|-----------|---|---|--------|---------|-----------|
| 4,398,704 | A | * | 8/1983 | Buchanan, Jr | B60G 11/28 |
|           |   |   |        |         | 267/64.21 |

(Continued)

FOREIGN PATENT DOCUMENTS

| EP | 1535828 A2 | 6/2005 |
|----|------------|--------|
| EP | 1621372 A1 | 2/2006 |

(Continued)

OTHER PUBLICATIONS

Author Uknown, "LVDT Use in Automotive Suspension," LVDT Applications, 23.1, Mar. 2015, Trans-Tek, Inc., 2 pages.

(Continued)

*Primary Examiner* — Hoai-An D. Nguyen
(74) *Attorney, Agent, or Firm* — Withrow & Terranova, P.L.L.C.

(57) ABSTRACT

A motorcycle suspension position monitoring system comprises: a first assembly including one or more Hall Effect sensors configured to be fastened to an outer fork tube; a first housing including a first magnet configured to be fastened to a fork guard so that the first magnet and the Hall Effect sensors move relative to one another in response to displacement of the motorcycle suspension; a second assembly including a Hall Effect sensor configured to be fastened to a frame of the motorcycle; a second housing including a second magnet configured to be fastened to a swingarm so that the second magnet and the Hall Effect sensor move relative to one another in response to displacement of the motorcycle suspension; and a device operatively connected to the Hall effect sensors and capable of receiving and recording respective output signals from the Hall Effect sensors.

18 Claims, 8 Drawing Sheets

(51) Int. Cl.
   *B62L 1/00*   (2006.01)
   *B62K 25/06*  (2006.01)
   *B62K 25/28*  (2006.01)
   *B62J 45/40*  (2020.01)

(58) Field of Classification Search
   CPC .. G01D 21/00; G01B 7/14; G01B 7/30; B62J 45/40; B62J 45/41; B62J 45/412; B62J 45/413; B62J 45/42; B62J 45/423; B62K 25/06; B62K 25/08; B62K 25/10; B62K 25/12; B62K 25/14; B62K 25/16; B62K 25/18; B62K 25/20; B62K 25/22; B62K 25/24; B62K 25/26; B62K 25/28; B62K 25/283; B62K 25/286; B62K 25/30; B62K 25/32; B62L 1/005; B62L 1/02; B62L 1/04; B62L 1/06; B62L 1/08; B62L 1/10; B62L 1/12; B62L 1/14; B62L 1/16
   USPC .................. 324/200, 207.11, 207.13, 207.2
   See application file for complete search history.

(56) References Cited

U.S. PATENT DOCUMENTS

| | | |
|---|---|---|
| 4,836,578 A | 6/1989 | Soltis |
| 4,838,574 A | 6/1989 | Baraszu |
| 5,359,288 A | 10/1994 | Riggs et al. |
| 5,497,324 A | 3/1996 | Henry et al. |
| 6,155,541 A | 12/2000 | Farris et al. |
| 6,401,883 B1 | 6/2002 | Nyce et al. |
| 6,707,290 B2 | 3/2004 | Nyce et al. |
| 7,793,971 B2 | 9/2010 | Sakashita et al. |
| 2005/0000770 A1 | 1/2005 | Oba et al. |
| 2015/0000390 A1 | 1/2015 | Casebeer II |
| 2019/0001779 A1* | 1/2019 | Cheng .................. B60G 17/08 |
| 2020/0216139 A1* | 7/2020 | Murakami ........... B60G 17/015 |
| 2020/0407004 A1* | 12/2020 | Krugman ............. B62K 25/286 |

FOREIGN PATENT DOCUMENTS

| | | |
|---|---|---|
| EP | 2017495 A1 | 1/2009 |
| EP | 1781960 B1 | 6/2012 |
| GB | 2229006 A | 9/1990 |
| GB | 2495617 A | 4/2013 |

OTHER PUBLICATIONS

Author Unknown, "Quarq ShockWiz," Product Information Sheet, quarq.com/shockwiz/, 2016, 5 pages.

Author Unknown, "Racing Data Acquisition Sensors," Sensors, Product list, Advantage Motorsports, advantagemotorsports.com/Sensors.htm, 2008, 9 pages.

Author Unknown, "Suspension movement monitoring sensors," Active Sensors, activesensors.com/markets/motorsport/suspension, 2015, 2 pages.

Hakewill, James, "Suspension Position Measurement," Version 1.1, Nov. 21, 2005, 26 pages.

Author Unknown, "Amazing Suspension. Made Easy!," Product Information Page, www.sussmybike.com/gettheflow, SussMyBike Ltd, 2015, 8 pages.

* cited by examiner

SUSPENSION POSITION MONITORING SYSTEM

RELATED APPLICATIONS

This application claims the benefit of Irish patent application number 2018/0165, filed Jun. 8, 2018, the disclosure of which is hereby incorporated herein by reference in its entirety.

FIELD OF THE DISCLOSURE

The application applies to mechanically suspended vehicles. In particular, the application applies to vehicles with adjustable rebound and compression suspension damping, and the means by which the position of the suspension is measured.

BACKGROUND

Mechanically suspended vehicles often comprise a sprung and unsprung mass connected together via a spring and damping mechanism here within referred to as "suspension". The suspension can be comprised in many forms such as, a telescopic fork with an enclosed coil spring and/or gaseous chamber(s) and submerged oil cartridge damping assembly, in either the one fork, or separate damping and spring functions split over two forks, a coil-over-damper assembly comprising of a coil spring over an oil dependant damping mechanism which can be attached directly to the sprung/unsprung mass or indirectly through a linkage system, or a gaseous chamber(s) encasing an oil dependant damping mechanism attached directly to the sprung/unsprang mass or indirectly through a linkage system. The main feature of the suspension mechanisms for performance vehicles is the tuneabillity of the overall suspension mechanism (Compression Damping, Rebound Damping, Spring Rate, Gaseous Pressure, Oil Volume, Oil Viscosity, Spring Preload, Sag Height (Race, Static and Dynamic)). The wide range of tuneable features is very difficult to fully understand without specific monitoring hardware and software, or a thorough personal understanding of suspension behaviour in given conditions. In an effort to facilitate informed decision making on suspension set-up, some companies have developed specific hardware and software for this task. However, the mechanisms used are often bulky and/or susceptible to damage and corrosion due to the operating conditions. The most common types of mechanisms used are linear variable differential transformers (LVDT) and/or retractable coils, for example, from Sussmybike, and/or gas pressure sensors, for example, from Shockwiz. These systems are relatively expensive to produce, lend themselves to be easily damaged, require complex calibration (with respect to the gas pressure sensors) and/or are susceptible to corrosion due to the operating conditions in the environment in which they are used.

SUMMARY

According to the invention there is provided, as set out in the appended claims, a suspension position monitoring system comprising:

A system for measuring the front and rear suspension position of a vehicle, in this case a motorcycle, which comprises of;

an assembly containing a single or plurality of Hall Effect sensor(s) effective for the purpose of being fastened to a suspension outer fork tube;

a housing containing a magnet and flange effective for the purpose of being fastened to a suspension fork guard;

an assembly containing a single or plurality of Hall Effect sensor(s) effective for the purpose of being attached to a motorcycle frame, or being fastened in a position relative to the frame structure;

a housing containing a magnet and flange effective for the purpose of being fastened to a suspension swingarm;

a wiring harness capable of relaying the sensor information to a central storage device;

a device capable of recording the analogue output of the Hall Effect sensors and digitally storing the information as such that it can be processed further using said device, or be exported for further processing.

The mechanisms currently in use for suspension position monitoring are often expensive, bulky and/or susceptible to damage and corrosion due to the operating conditions they are subjected to. Herein described is a method to determine suspension position using an affordable, compact, lightweight and robust system requiring minimal maintenance and is able to withstand harsh operating environments.

Measuring Front Suspension Position

The proposed invention uses a means of detecting the magnetic field strength of a magnet to determine the position of the inner fork tube relative to the outer fork tube.

In one embodiment, the magnet is encased in a polymer housing.

In one embodiment, the polymer housing is formed as such to allow fasteners such as bolts to be inserted through orifices in a flange protruding from the main body of the housing.

In one embodiment, the polymer housing has a slot feature capable of being mounted on a track.

In one embodiment, the magnet housing is attached to the brake line clamp on the fork guard using the existing nut and bolt assembly or bolt assembly.

In one embodiment, a Hall Effect sensor assembly (comprising of up to 1000 (one thousand), or a minimum of 1 (one) sensor(s)) is attached to the outer fork tube.

In one embodiment, the assembly can be made of a polymer material which can encase the Hall Effect sensor(s).

In one embodiment, the polymer material can be formed as such to have a ridge protruding from the front surface that can act as a track, corresponding to the slot on the magnet housing for the front suspension measurement.

In one embodiment, the Hall Effect sensor(s) are positioned on a length of printed circuit board.

In one embodiment, the printed circuit board has a processing chip capable of interpreting the Hall Effect sensor(s) analogue output and preparing the information to be sent to a central data interpreting and storage device.

In one embodiment, the Hall Effect sensors have a linear distribution along the assembly.

In one embodiment, the Hall Effect sensor(s) are equally distributed along the assembly.

In one embodiment, the Hall Effect sensor(s) are unequally distributed along the assembly.

In one embodiment, the assembly can be attached to the outer fork tube using fasteners such as cable ties.

In one embodiment, the surface of the assembly in contact with the outer fork tube may have an adhesive/tacky surface finish to add positional stability.

As the inner fork tube is compressed into the outer fork tube due to the weight of the motorcycle or an external force applied from above or below, the magnetic field detected by the sensor(s) becomes stronger and weaker depending on the position. The magnetic field value can then be interpreted using the Hall Effect sensor(s) to identify the position of the inner fork tube relative to the outer fork tube, and as such the front suspension movement and/or position.

Measuring Rear Suspension Position

The proposed invention uses a means of detecting the magnetic field strength of a magnet to determine the position of the swing-arm relative to the rear brake master cylinder and hence the motorcycle frame.

In one embodiment, the magnet can be contained in a polymer housing.

In one embodiment, the polymer housing is formed as such to allow a fastener(s) such as a bolt(s) to be inserted through an orifice(s) on a flange formed as part of the housing.

In one embodiment, the housing includes an additional flange(s) which can be used to position a fastener(s) such as cable tie(s).

In one embodiment, the fasteners are used to secure the housing in a position on the swing-arm useful for the purpose of detecting the suspension position.

In one embodiment, the housing can be designed as such to include the brake line retaining mechanism described herein to reduce the movement of the brake line.

In one embodiment, the housing can be bolted into position using the existing brake line retainer thread locations, in which case it is intended to replace the existing brake line retainer.

In one embodiment, the housing can be secured in position using alternate types of fastener such as (a) cable tie(s), locking wire(s).

In one embodiment, a sensor assembly is attached to the rear brake master cylinder by being placed on top of the fluid reservoir cap and, using the fluid reservoir cap bolts, is bolted into position.

In one embodiment, a sensor assembly can be attached by placing the sensor housing in between the frame and master cylinder and bolting it into position using the master cylinder bolts.

As the swing-arm is rotated through the axis of the axle in the frame, due to the weight of the motorcycle or an external force applied from above or below, the magnet is brought closer and further away from the sensor causing the magnetic field detected by the sensor to become stronger and weaker depending on the rotation of the swing-arm. The magnetic field value can then be interpreted to identify the position of the swing-arm relative to the frame.

Data Interpreting and Recording Device

The proposed invention uses a means of electronically recording the suspension movement information in a digital format, having been converted from an analogue output, to a central recording device capable of wirelessly transmitting the information to another device.

In one embodiment, the central recording device has a printed circuit board.

In one embodiment, the printed circuit board has a flash memory storage chip.

In one embodiment, the printed circuit board has a removable memory storage device.

In one embodiment, the printed circuit board has circuitry capable of recharging a rechargeable battery.

In one embodiment, the printed circuit board has a microprocessor capable of retaining a programming language in firmware for the purpose of carrying out the intended tasks of the recording device.

In one embodiment, the printed circuit board has a microcontroller capable of retaining a programming language in firmware for the purpose of carrying out the intended tasks of the recording device.

In one embodiment, the printed circuit board has a WiFi™ communication chip for the purpose of transmitting and receiving information to and from another electronic device.

In one embodiment, the printed circuit board has a Bluetooth™ communication chip for the purpose of transmitting and receiving information to and from another electronic device.

In one embodiment, the printed circuit board is fitted with block connectors to connect to sensor cable(s).

In one embodiment, the block connectors of the printed circuit board are designed as such to be male and female, and only connect with the corresponding connector for the purpose of ensuring the correct sensors are connected to the correct microprocessor/microcontroller pins.

In one embodiment, the printed circuit board has a connector for a dc power supply from a battery.

In one embodiment, the central recording device contains a rechargeable battery connected to the printed circuit board.

In one embodiment, the central recording device has a polymer housing to encase the printed circuit board.

In one embodiment, the central recording device has a polymer housing to encase the printed circuit board and rechargeable battery.

In one embodiment, the printed circuit board has a connector for a dc power supply to be taken directly from the motorcycles' rectifier output.

In one embodiment, the printed circuit board is powered by a cable that is directly connected to the rectifier of the motorcycle.

In one embodiment, the power cables from the rectifier are inserted into a block connector that fits between the OEM connectors of the output of the rectifier. This both relays the power through to the required areas of the motorcycle, as well as to the central recording device of this invention.

After the central recording device is powered on, either through the device battery, or by starting the motorcycles engine when the rectifier output is connected to the printed circuit board, the sensors to measure suspension position are energised. The varying output voltage from each of the sensors as the suspension moves is fed back to the central recording device where the values over time are recorded onto the printed circuit board's memory storage. The information is recorded at a sample between (one hundredth) 1/100 Hz to (ten thousand) 10,000 Hz.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

The invention will be more clearly understood from the following description of embodiments thereof, given by way of example only, with reference to the accompanying drawings, in which.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
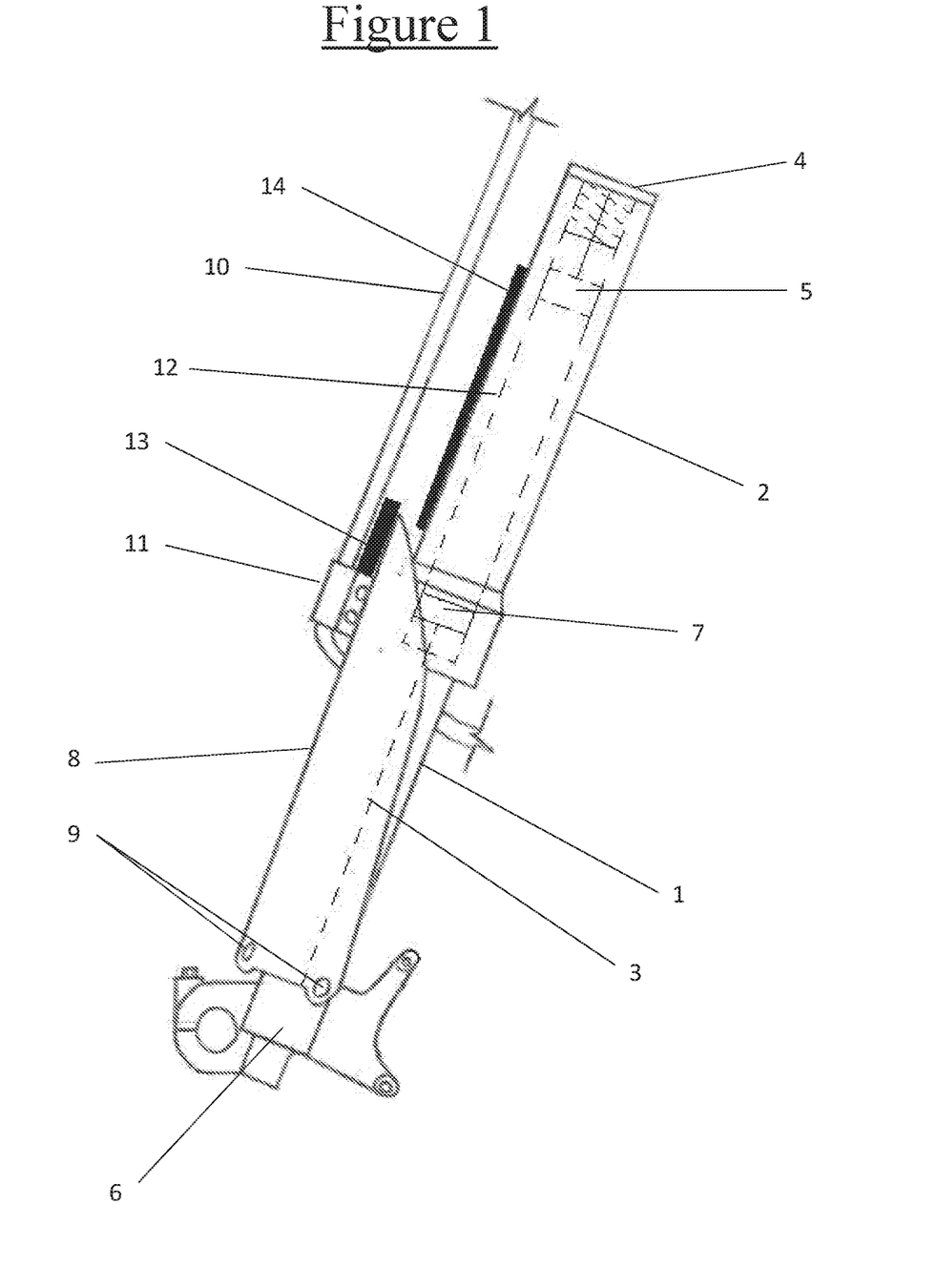
FIG. 1 is an upside-down telescopic fork assembly typically found on the front of a motorcycle.

Shown in FIG. 1 is a telescopic fork assembly which contains a viscous fluid used to convert the compression and rebound movement of an inner fork tube 1 into heat in a process known as damping, and suspend the sprung weight using a mechanical or gaseous spring. The assembly is comprised of the inner 1 and an outer fork tube 2 which are connected together via a damping rod 3 located within the tubes. The outer fork tube 2 is capped with a threaded insert 4. On top of this insert are oftentimes found adjustable clickers, used to alter the compression damping forces via adjusting valving 5, or valve bypass orifice area. The outer fork cap 4 can also have a bleed hole, used to release gasses that have built up due to the heat generated in the viscous fluid during damping. At the bottom of the inner tube is a cast metal end lug 6. The end lug 6 has many functions. One function is to seal the inner fork tube 1 to retain the viscous fluid. Another function of the inner tube end lug 6 is to house a rebound damping adjustable clicker. The rebound clicker is used to alter the rebound damping forces via adjusting valving 7, or valve bypass orifice area used to control the flow of damping fluid when the suspension fork is extending. The outer surface of the inner fork tube 1 has an almost mirror finish. The surface finish is very important to reduce friction between the inner fork tube 1 outer surface and the dust and fluid seals, and the alignment bushes located inside the outer fork tube 2. Sometimes the outer surface of the inner fork tube 1 can be coated with a lubricous coating to reduce friction further, known as DLC (Diamond Like Coating).

To protect the inner fork tube 1 outer surface, a fork guard 8 is placed in front of the inner fork tube 1. The fork guard 8 is attached to the suspension assembly via bolts 9 which are threaded into the inner fork tube end lug 6. The fork guard 8 can also be used to secure a brake fluid line 10. The brake fluid line 10 is secured by clamping the line 10 between two surfaces of a brake line clamp 11, usually via a nut and bolt assembly, or by threading a bolt directly into the fork guard 8 material. The inner fork tube 1 is returned to its fully extended position by a spring force. This spring force can be generated via the compression of a coil spring, or a gaseous chamber(s). In some front suspension assemblies, one fork is used to house the damping control, while the second fork is used to house the return spring. In some front suspension assemblies, one or both inner fork tube end lugs 6 are used to attach brake calliper/callipers (not shown).

The damping rod 3 is fed into an inner cartridge assembly 12 located inside the outer fork tube 2. The adjustable clickers can be used to adjust valving 5/7 dependant on the inner fork tube 1 velocity, and hence the velocity at which the internal damping rod 3 travels through the viscous fluid in the cartridge 12 located in the outer fork tube 2. The valving 5/7 can be adjusted from below for the rebound movement of the inner fork tube 1, and adjusted from above for the compression movement of the inner fork tube 1, or vice versa depending on how the valving 5/7 is constructed.

Figure 4:
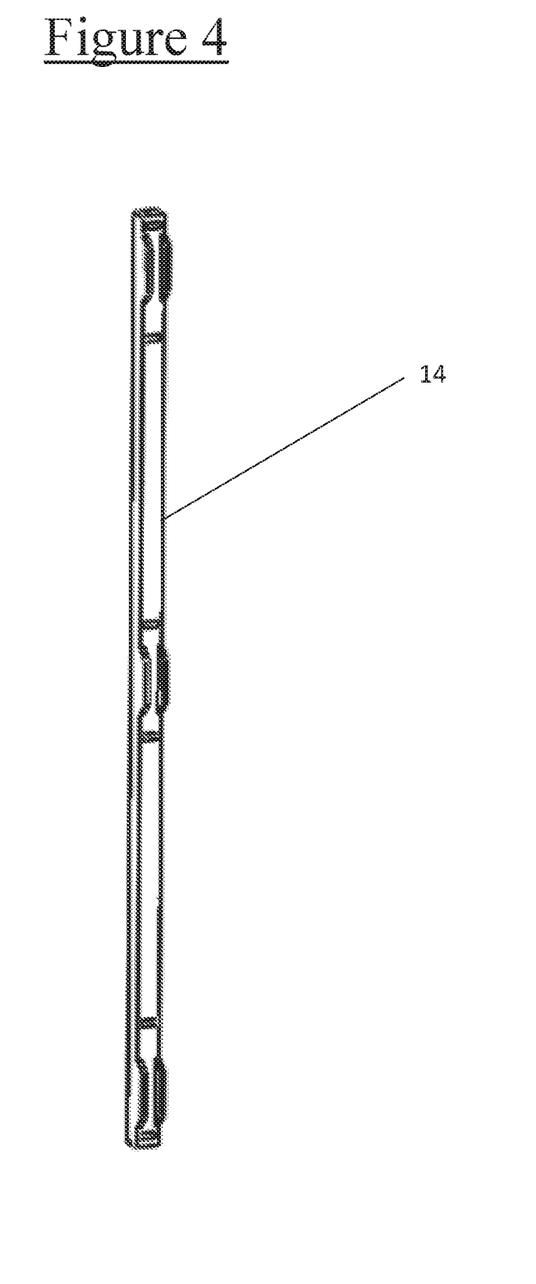
FIG. 4 is an example of the housing that may be used to fix the Hall Effect sensor(s) for front suspension position measurement.

The illustrated embodiment detects the magnetic field strength of a magnet 13 to determine the position of the inner fork tube 1 relative to the outer fork tube 2. The magnet 13 can be encased in a polymer housing 15, FIG. 3(*a*), formed such as to allow fasteners such as bolts to be inserted through orifices 17 in a flange 18 protruding from a main body of the housing. The magnet housing 15 or an alternative housing 16 shown in FIG. 3(*b*) can be attached to the brake line clamp 11 on the fork guard 8 using the existing nut and bolt assembly or bolt assembly. Referring to FIG. 4, a Hall Effect sensor assembly 14 (comprising of up to 1000 (one thousand), or a minimum of 1 (one) sensor(s)) is attached to the outer fork tube 2. Where a plurality of sensors is employed, each can be individually identified.

The assembly 14 can be made of a polymer material which can encase the Hall Effect sensor(s) throughout a linear distribution. The Hall Effect sensor(s) can be connected to a printed circuit board (not shown) on which there can also be a processor capable of relaying the analogue sensor(s) output(s) digitally to a central storage device 19, FIG. 8. The Hall Effect sensor(s) may be equally or unequally distributed. The assembly can be attached to the outer fork tube 2 using fasteners such as cable ties. The surface of the assembly 14 in contact with the outer fork tube 2 may have an adhesive/tacky surface finish to add positional stability. As the inner fork tube 1 is compressed into the outer fork tube 2 due to the weight of the motorcycle or an external force applied from above or below, the magnetic field detected by the respective sensor(s) becomes stronger and weaker depending on the position of the magnet relative to the sensors. The magnetic field value can then be interpreted using the Hall Effect sensor(s) to identify the position of the inner fork tube 1 relative to the outer fork tube 2.

Figure 2:
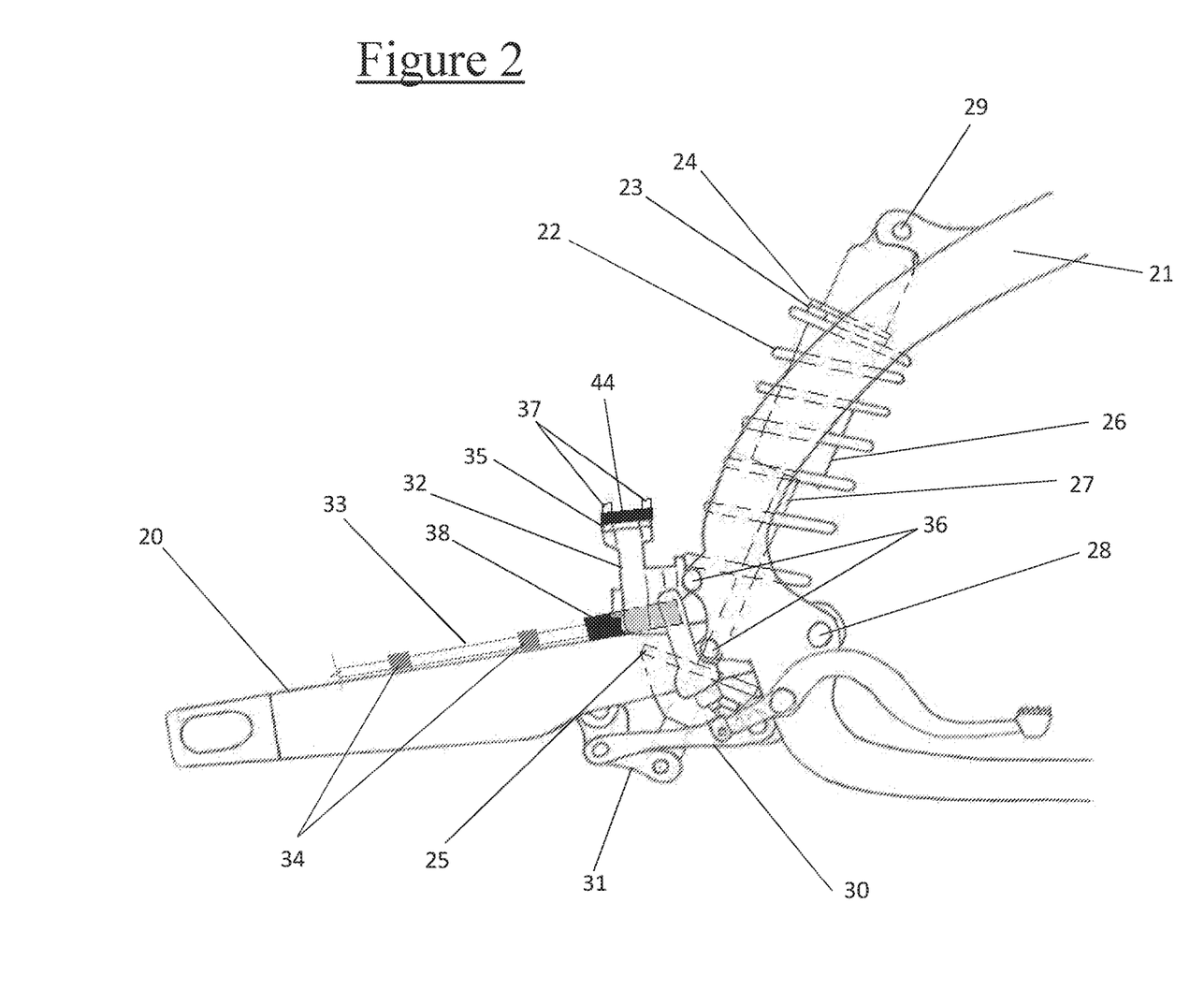
FIG. 2 is a swing arm-linkage-frame assembly used to connect the coil-over-damper suspension assembly to the frame and the swing-arm. This assembly is typically found on the rear of the motorcycle.
Figure 3A:
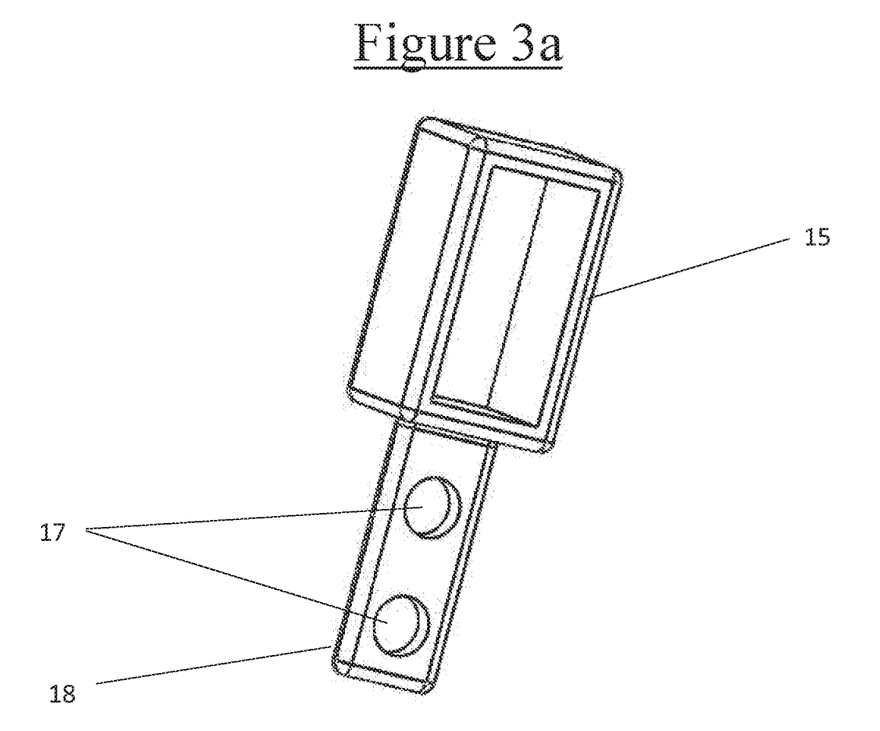
FIG. 3a is an example of the type of magnet housing(s) that may be used to fix the magnet to the front fork guard where the brake line clamp is made of two metal components protruding from a flange on the fork guard.
Figure 3B:
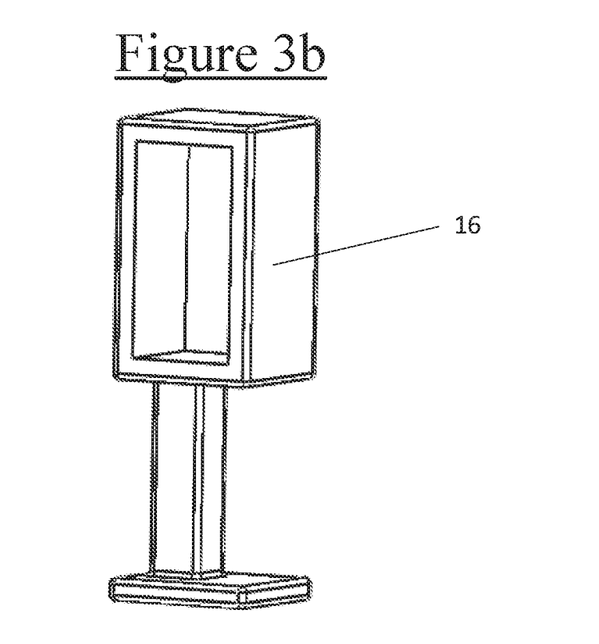
FIG. 3b is an example of the type of magnet housing(s) that may be used to fix the magnet to the front fork guard where the brake line is clamped using a polymer component that is bolted directly to a corresponding feature on the fork guard.

Shown in FIG. 2 is a suspension assembly typically found on the rear of a motorcycle. The coil-over-damper shock absorber suspension assembly is used to control the movement of a swing-arm 20 relative to a frame 21. The shock absorber comprises of a coil spring 22 held in position via an adjustable pre-tensioner collar 23 and locking collar 24 at one end, and butted against a removable fixed position collar 25 at the other end. The coil spring 22 is placed around a viscous fluid damper assembly 26. The damper assembly 26 can be used to house rebound valving similar to the set-up used on the telescopic fork described in relation to FIG. 1.

The shock absorber also can have a reservoir used to store the viscous fluid during compression and can be the location of the compression valving. Inside the reservoir can be a gaseous bladder. As the bladder is compressed by the incoming fluid which has been displaced by the volume of a damping rod 27, the volume decreases. As the damping rod 27 rebounds, the pressure in the gaseous bladder is used to force the viscous fluid back through the rebound damping valve. The bladder pressure can be matched to the negative pressure at the underside of compression valve so as to reduce the risk of cavitation (propagation of gas bubbles) in the viscous fluid. The swing-arm 20 can be connected to the frame 21 via an axle 28. The axle can be placed through a series of concentric orifices of the same diameter located in the frame 21 and swing-arm 20 and can be secured in position via a nut threaded onto one end. The swing-arm 20 can then pivot around the central axis of the axle 28. The shock absorber can be connected to the frame 21 via a fisheye rotational bearing 29 at the top and via a linkage mechanism connected to the swing-arm 20 at the bottom. The linkage mechanism can comprise of a connecting rod 30 and relay arm 31.

The relay arm 31 can be used to attach the bottom of the shock absorber to the swing-arm 20 and the connecting rod 30. The connecting rod 30 can be used to connect the relay arm 31 to the motorcycle frame 21. A rear brake master cylinder 32 can be also attached to the frame 21. The rear brake master cylinder is used to force a fluid through a brake line 33 to apply a force through the brake pads to the brake disc, reducing the speed of the brake disc by converting the rotational force into heat. The brake line 33 can be held in position using polymer retainers 34 which can be secured by being bolted to sections of the swing-arm 20. The polymer retainers 34 can have a type of "n" shape which fits over the brake line 33 reducing the lateral and vertical movement of the brake line 33. Alternatively, the brake line 33 may be secured by a longer piece of polymer which is attached to the swing-arm 20. The principle remains the same in that movement of the brake line 33 is reduced through being fixed into position by these polymer parts. The rear brake master cylinder 32 includes a fluid reservoir including a cap 35 and is bolted 36 to the frame 21 in 1 (one) to 5 (five) locations. The cap 35 is held in position using 1 (one) to 5 (five) bolts 37.

Figure 5A:
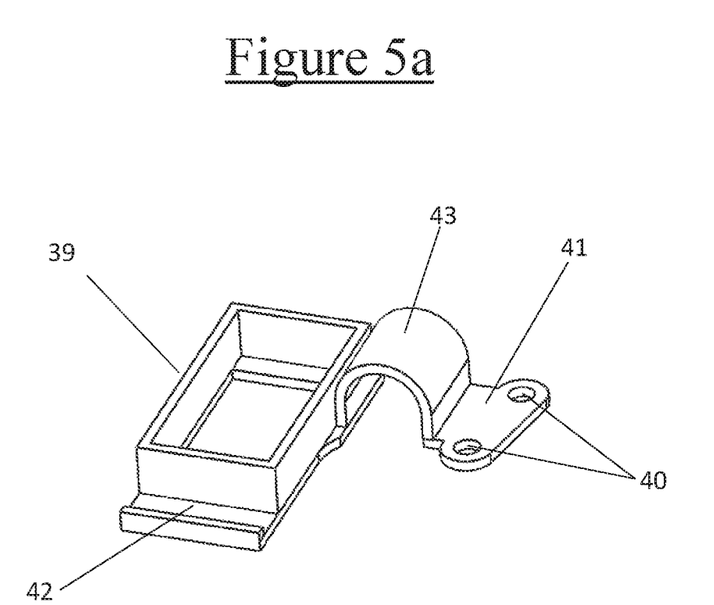
FIG. 5a is an example of the type of magnet housing(s) that may be used to fix the magnet to the swing-arm where the magnet housing is intended to replace the existing brake line retainer, and can be bolted to the swing arm.
Figure 5B:
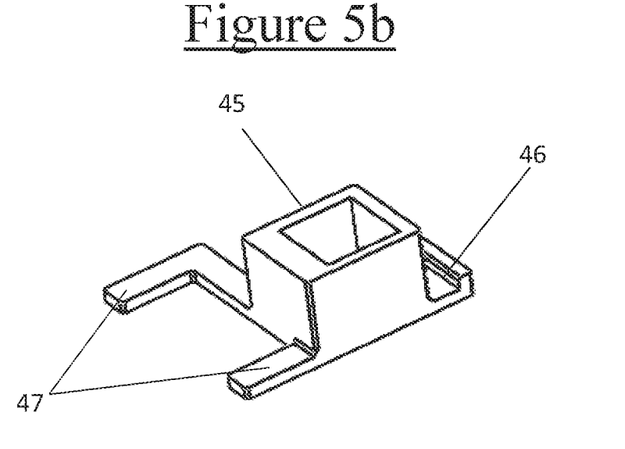
FIG. 5b is an example of the type of magnet housing(s) that may be used to fix the magnet to the swing-arm where the magnet housing is not intended to replace the existing brake line retainer, and can be fixed in position using fasteners such as cable tie(s).

The illustrated embodiment detects the magnetic field strength of a magnet 38 to determine the position of the swing-arm 20 relative to the rear brake master cylinder 32 and hence the motorcycle frame 21. The magnet 38 can be contained in a polymer housing 39, FIG. 5(*a*), formed such as to allow a fastener(s) such as a bolt(s) to be inserted through an orifice(s) 40 on a flange 41 formed as part of the housing 39. The housing 39 may also include an additional flange(s) 42 which can be used to position a fastener(s) such as cable tie(s). In each case, the fasteners are used to secure the magnet housing 39 in position. The polymer housing 39 can be designed as such to include a brake line retaining mechanism 43 described previously to reduce the movement of the brake line 33. The housing can be bolted into position using the existing brake line 33 retainer 34 thread locations, in which case it is intended to replace an existing brake line retainer 34. The housing 39 can be secured in position using alternate types of fastener such as (a) cable tie(s), locking wire(s). Where a longer piece of polymer is used to secure the brake line 33, the magnet housing is replaced with an alternate housing 45, FIG. 5(b). The alternate housing 45 also has a flange 46 which can be used to position a fastener(s) such as cable tie(s). The alternate housing 45 may also have additional stability flanges 47 which are used to reduce movement of the magnet during use.

Figure 6A:
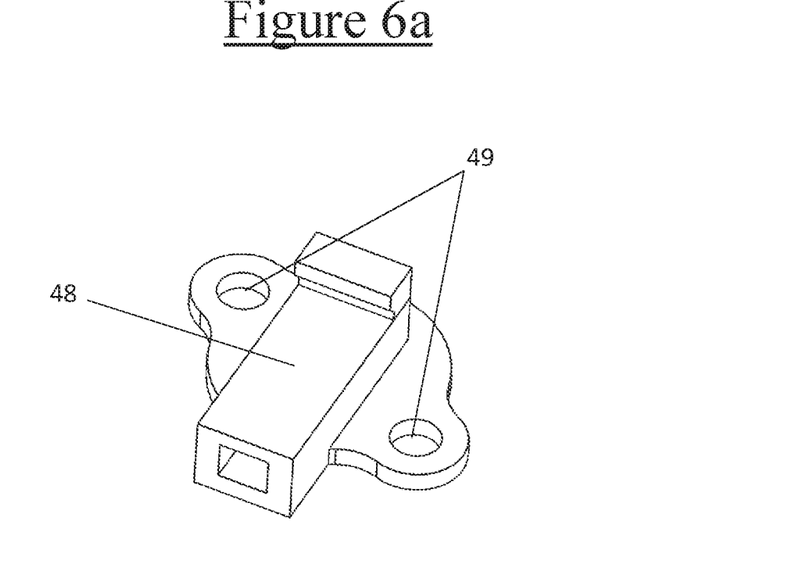
FIG. 6a is an example of the housing(s) that may be used to fix the Hall Effect sensor(s) for use for rear suspension position measurement, by being bolted into position on top of the rear brake master cylinder reservoir cap.
Figure 6B:
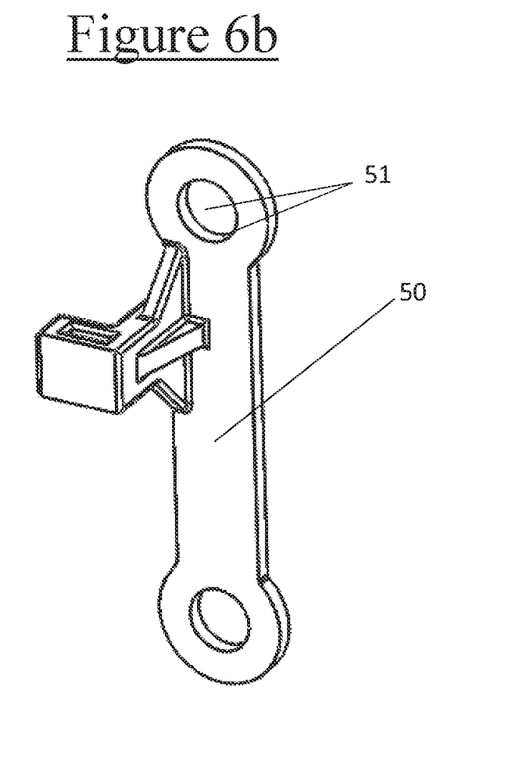
FIG. 6b is an example of the housing(s) that may be used to fix the Hall Effect sensor(s) for use for rear suspension position measurement, by being bolted into position in between the rear brake master cylinder and motorcycle frame.

Referring back to FIG. 2, a sensor assembly 44 can be attached to the rear brake master cylinder 32 by being placed on top of the fluid reservoir cap 35 and, using the fluid reservoir cap bolts 37, bolted into position. Referring to FIG. 6(a), a sensor housing 48 can have bolt hole orifices 49 where the reservoir cap bolts 37 can pass through. An alternative sensor housing 50, FIG. 6(b), can also be attached by placing the assembly in between the frame 21 and master cylinder 22 and bolting it into position using the master cylinder bolts 36. The sensor housing 50 can also have bolt hole orifices 51 where the master cylinder bolts 36 can pass through.

As the swing-arm 20 is rotated through the axis of the axle 28 in the frame 21, due to the weight of the motorcycle or an external force applied from above or below, the magnet 38 is brought closer and further away from the sensor assembly 44 causing the magnetic field detected by the Hall effect sensor(s) within the sensor assembly 44 to become stronger and weaker depending on the rotation of the swing-arm 20. The magnetic field value can then be interpreted to identify the position of the swing-arm 20 relative to the frame 21.

Figure 7:
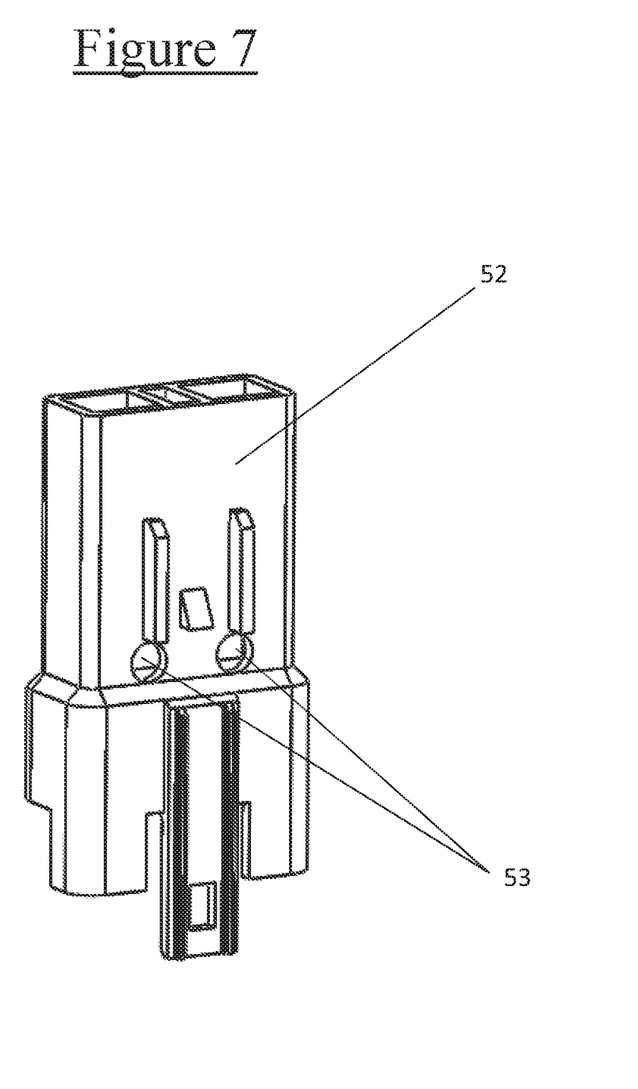
FIG. 7 is an example of the rectifier block connector that may be used to relay power from an OEM rectifier, through OEM rectifier block connectors.
Figure 8:
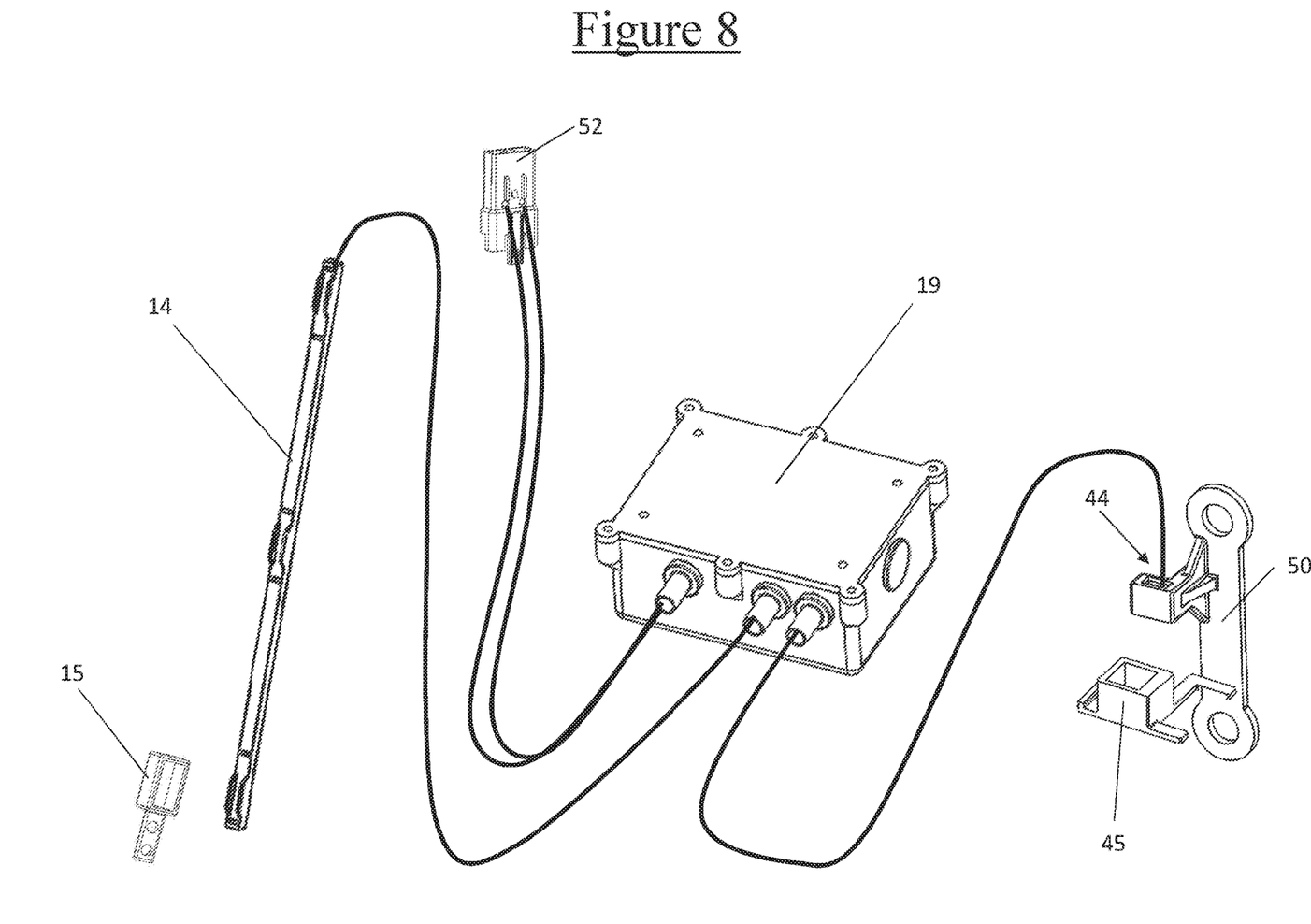
FIG. 8 is an example of the front and rear suspension measurement features, wiring harness, and data interpreting and recording device, shown in space.

Referring to FIG. 8, in one embodiment, the voltage values from the front 14 and rear 44 sensor assemblies are fed into an analogue to digital converter. The change in voltage value dependant on changes in the magnetic field value due to suspension movement can be used to identify the magnetic field value and hence suspension position. The values are then recorded to a device 19 capable of retaining the information over time in a digital format. The device 19 can be powered by a rechargeable battery, or directly from the motorcycles power supply through relay cables that can be connected to the output of the motorcycles rectifier through an adapter block connector 52, shown in more detail in FIG. 7. The relay cables can be fed into the adapter block connector 52 through orifices 53 in the main body of the adapter. The information can then be extracted and interpreted further using software.

In the arrangement of FIG. 8, analog signals from the Hall Effect sensors can be converted to digital form within each of the assemblies 14, 44 before being provided to the device 19 for recordal. In other embodiments, the device 19 may comprise analog to digital circuitry common to each of the sensor assemblies and analog signals may be passed to the device 19 for conversion into digital form and storage.

Information stored by the device 19 can be extracted using any number of conventional techniques. For example, the device 19 may be provided with removeable storage (not shown) or a communications port, such as a USB port, allowing the device 19 to connect to a laptop or smartphone for uploading stored information.

Alternatively, the device 19 may be provided with wireless communications functionality including for example, Bluetooth™, WiFi™ or cellular communications capacity enabling the device 19 to upload stored information to a remote computer.

In other embodiments, the functionality of the device 19 may be integrated into one or other of the assemblies 14, 44, with the devices having a master and slave relationship.

In still further variations of the embodiment of FIG. 8, the sensor assemblies 14, 44 could be connected to the device 19 or one another wirelessly again using any of Bluetooth™, WiFi™ or cellular communications. Note that in general, reliance on optical connectivity between any of the sensor assemblies 14, 44 or the device 19 is to be avoided as the operating environment of competition motorcycles of the type whose suspension characteristics would be monitored by the present system is likely to be extremely dirty.

Those skilled in the art will recognize improvements and modifications to the preferred embodiments of the present disclosure. All such improvements and modifications are considered within the scope of the concepts disclosed herein and the claims that follow.

What is claimed is:

1. A motorcycle suspension position monitoring system comprising:
 a first assembly including a first set of one or more Hall Effect sensors configured to be fastened to an outer fork tube of said motorcycle suspension;
 a first housing including a first magnet configured to be fastened to a fork guard of said motorcycle suspension so that said first magnet and said first set of Hall Effect sensors move relative to one another in response to displacement of said motorcycle suspension;
 a second assembly including a second set of one or more Hall Effect sensors configured to be fastened to a frame of said motorcycle;
 a second housing including a second magnet configured to be fastened to a swingarm of said motorcycle suspension so that said second magnet and said second set of Hall Effect sensors move relative to one another in response to displacement of said motorcycle suspension; and
 a device operatively connected to each of said first and second sets of Hall Effect sensors and capable of receiving and recording respective output signals from said Hall Effect sensors.

2. The system of claim 1 wherein one or more of said first and second housings are formed of a polymeric material.

3. The system of claim 1 wherein one or more of said first and second housings define one or more apertures allowing fasteners to be inserted therethrough.

4. The system of claim 1 wherein said first housing is configured to be fastened to said fork guard using pre-existing connectors for a brake line clamp.

5. The system of claim 1 wherein one or more of said first and second assemblies comprises a polymer material encasing the respective set of Hall Effect sensors.

6. The system of claim 1 wherein the first set of Hall Effect sensors comprises a plurality of sensors distributed lengthwise along a printed circuit board.

7. The system of claim 6 wherein the plurality of sensors are distributed either equally or unequally along the printed circuit board.

8. The system of claim 1 wherein the device includes a removeable storage chip.

9. The system of claim 1 wherein said first assembly is configured to be fastened to said outer fork tube using one or both of: cable ties; or an adhesive contact.

10. The system of claim 1 wherein the second housing includes one or more flanges enabling said second housing to be fastened to said swing arm using respective cable ties or locking wires.

11. The system of claim 1 wherein said second housing includes a brake line clamp.

12. The system of claim 11 wherein said second housing is configured to be fastened to said swing arm using pre-existing connectors for said brake line clamp.

13. The system of claim 1 wherein said second assembly is configured to be fastened to a rear brake master cylinder of said motorcycle.

14. The system of claim 13 wherein said second assembly is configured to be fastened to a fluid reservoir cap of said rear brake master cylinder using cap bolts for said fluid reservoir.

15. The system of claim 13 wherein said second assembly is configured to be fastened between the frame and the rear brake master cylinder using bolts for the master cylinder.

16. The system of claim 1 wherein said device comprises a programmable processor configured to transmit the recorded output signals to another electronic device.

17. The system of claim 16 wherein the device further includes a wireless adapter enabling said processor to transmit and receive information to and from the another electronic device.

18. The system of claim 1 wherein the device comprises distinct removable wired connectors for each of said first and second assemblies and a power supply for said motorcycle.

* * * * *